United States Patent
Misawa

(10) Patent No.: US 11,433,777 B2
(45) Date of Patent: Sep. 6, 2022

(54) CONTROL DEVICE

(71) Applicant: TOYOTA JIDOSHA KABUSHIKI KAISHA, Toyota (JP)

(72) Inventor: Takahiro Misawa, Okazaki (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 0 days.

(21) Appl. No.: 17/168,846

(22) Filed: Feb. 5, 2021

(65) Prior Publication Data

US 2021/0300201 A1 Sep. 30, 2021

(30) Foreign Application Priority Data

Mar. 25, 2020 (JP) ............................. JP2020-054942

(51) Int. Cl.
*B60L 53/65* (2019.01)
*B60L 53/66* (2019.01)
*G06Q 20/14* (2012.01)
*B60L 53/64* (2019.01)

(52) U.S. Cl.
CPC ............. *B60L 53/665* (2019.02); *B60L 53/64* (2019.02); *G06Q 20/145* (2013.01)

(58) Field of Classification Search
None
See application file for complete search history.

(56) References Cited

U.S. PATENT DOCUMENTS

| 10,065,520 | B2* | 9/2018 | Zhang | B60L 53/64 |
| 2019/0039467 | A1* | 2/2019 | Hortop | B60L 58/12 |
| 2019/0092176 | A1* | 3/2019 | Uyeki | B60L 53/665 |

FOREIGN PATENT DOCUMENTS

| JP | 2009-118652 A | 5/2009 | | |
| JP | 2011-015521 A | 1/2011 | | |
| JP | 2012095377 A | * 5/2012 | ............ | H04N 1/344 |
| JP | 2018-074616 A | 5/2018 | | |
| WO | WO-2020172116 A1 | * 8/2020 | ............ | G06Q 50/06 |

\* cited by examiner

*Primary Examiner* — Joseph W. King
*Assistant Examiner* — Carol A See
(74) *Attorney, Agent, or Firm* — Oliff PLC

(57) ABSTRACT

A control device controls charging of a power storage device mounted on a vehicle from the external power supply. The control device includes an electronic control unit. The electronic control unit is configured to acquire information relating to an electric power fee for the charging in each time slot divided in advance and cause, when the time slot is switched such that the electric power fee becomes relatively low after the switching of the time slot compared to before the switching during the charging, the external power supply to charge the power storage device so as to apply the electric power fee that is relatively low in the time slot after the switching.

5 Claims, 4 Drawing Sheets

CONTROL DEVICE

CROSS-REFERENCE TO RELATED APPLICATION

This application claims priority to Japanese Patent Application No. 2020-054942 filed on Mar. 25, 2020, incorporated herein by reference in its entirety.

BACKGROUND

1. Technical Field

The present disclosure relates to a control device.

2. Description of Related Art

In the related art, there is a known technique of determining, in a household charging system for charging an electric vehicle, charging start time based on contract contents of electric power fee menu of a consumer's house such that an electric power fee required for charging is relatively low (see, for example, Japanese Unexamined Patent Application Publication No. 2009-118652 (JP 2009-118652 A)).

SUMMARY

However, when a user uses a public charging facility on the go, the user is typically in need of starting immediate charging in most cases, and it is highly likely that a timing to start charging cannot be freely adjusted. Therefore, for example, when the electric power fee varies depending on a time slot, the user may be disadvantaged as the electric power fee corresponding to the time slot when starting the charging is billed even if the time slot is switched such that the electric power fee becomes relatively low after the switching of the time slot compared to before the switching during the time from start of the charging to end of the charging.

Therefore, the present disclosure can provide a technique capable of charging a power storage device mounted on a vehicle at a lower fee in a public charging facility, etc.

A control device according to a first aspect of the present disclosure is a control device that executes control relating to charging of a power storage device mounted on a vehicle from an external power supply. The control device includes an electronic control unit. The electronic control unit is configured to: acquire information relating to an electric power fee for the charging in each time slot that is divided in advance; and cause, when the time slot is switched such that the electric power fee becomes relatively low after switching of the time slot compared to before the switching during the charging, the external power supply to charge the power storage device so as to apply the electric power fee that is relatively low in the time slot after the switching.

With the configuration above, the control device can cause the external power supply to charge the power storage device mounted on the vehicle at a lower electric power fee in a public charging facility, etc. where the external power supply is installed.

According to the aspect above, the electronic control unit may be configured to: suspend the charging when the time slot is switched such that the electric power fee becomes relatively low after the switching of the time slot compared to before the switching during the charging; and execute processing relating to a start of the charging, including processing relating to billing of the electric power fee, again in the time slot after the switching.

With the processing above, the control device can restart the charging at a relatively low electric power fee by renegotiating the billing with the external power supply side in accordance with the switching to the time slot in which the electric power fee is relatively low. Therefore, specifically, the control device can cause the external power supply to charge the power storage device such that a relatively low electric power fee is applied in the time slot after the switching.

Further, according to the aspect above, the electronic control unit may be configured to continue the charging when the time slot is switched such that the electric power fee becomes relatively high after the switching of the time slot compared to before the switching during the charging.

With the processing above, when the time slot is switched to the time slot in which the electric power fee becomes relatively high, the control device can apply the electric power fee in the time slot before the switching to the billing. With the configuration above, the control device can cause the external power supply to charge the power storage device mounted on the vehicle at a further lower electric power fee in the public charging facility, etc. where the external power supply is installed.

Further, according to the aspect above, the electronic control unit may be configured to: suspend the charging in accordance with a predetermined input received from an user when the time slot is switched such that the electric power fee becomes relatively low after the switching of the time slot compared to before the switching during the charging; and enable or disable a function of executing the processing relating to the start of the charging, including the processing relating to the billing of the electric power fee, again in the time slot after the switching.

With the configuration above, when the function is disabled, the control device can continue the charging and shorten time required for the charging even when the time slot is switched to a time slot in which the electric power fee is relatively low. Therefore, for example, when a user intends to shorten the time required for the charging rather than to reduce the electric power fee, the function can be manually disabled. Therefore, the control device can reflect the intention of the user, that is, whether the user places an importance on the electric power fee or the time required for charging in the control processing relating to the charging.

Further, according to the aspect above, the electronic control unit may be configured to continue the charging when a charge amount of the power storage device is relatively large although the time slot is switched such that the electric power fee becomes relatively low after the switching of the time slot compared to before the switching during the charging.

With the configuration above, the control device can prioritize shortening of the time required for the charging when the effect of reducing the electric power fee applied is relatively low although the electric power fee becomes relatively low by switching of the time slot. This is because when the charge amount of the power storage device is relatively large, the remaining electric energy supplied to the power storage device is relatively small, and the effect of reducing the electric power fee applied becomes relatively low.

Further, according to the aspect above, the electronic control unit may be configured to continue the charging when a difference in the electric power fee before and after the switching of the time slot is relatively small although the time slot is switched such that the electric power fee becomes relatively low after the switching of the time slot compared to before the switching during the charging.

With the configuration above, the control device can prioritize shortening of the time required for the charging when the effect of reducing the electric power fee applied is relatively low although the electric power fee becomes relatively low by switching of the time slot.

Further, according to the aspect above, the control device may be mounted on the vehicle.

With the configuration above, the control device can cause the external power supply to charge the power storage device from the vehicle side such that a relatively low electric power fee is billed.

With the configuration above, the present disclosure can provide a technique that is capable of charging of the power storage device mounted on the vehicle at a lower electric power fee in a public charging facility, etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the drawings.

Overview of Vehicle Charging System

First, the outline of a vehicle charging system 1 according to the embodiment will be described with reference to FIG. 1.

Figure 1:
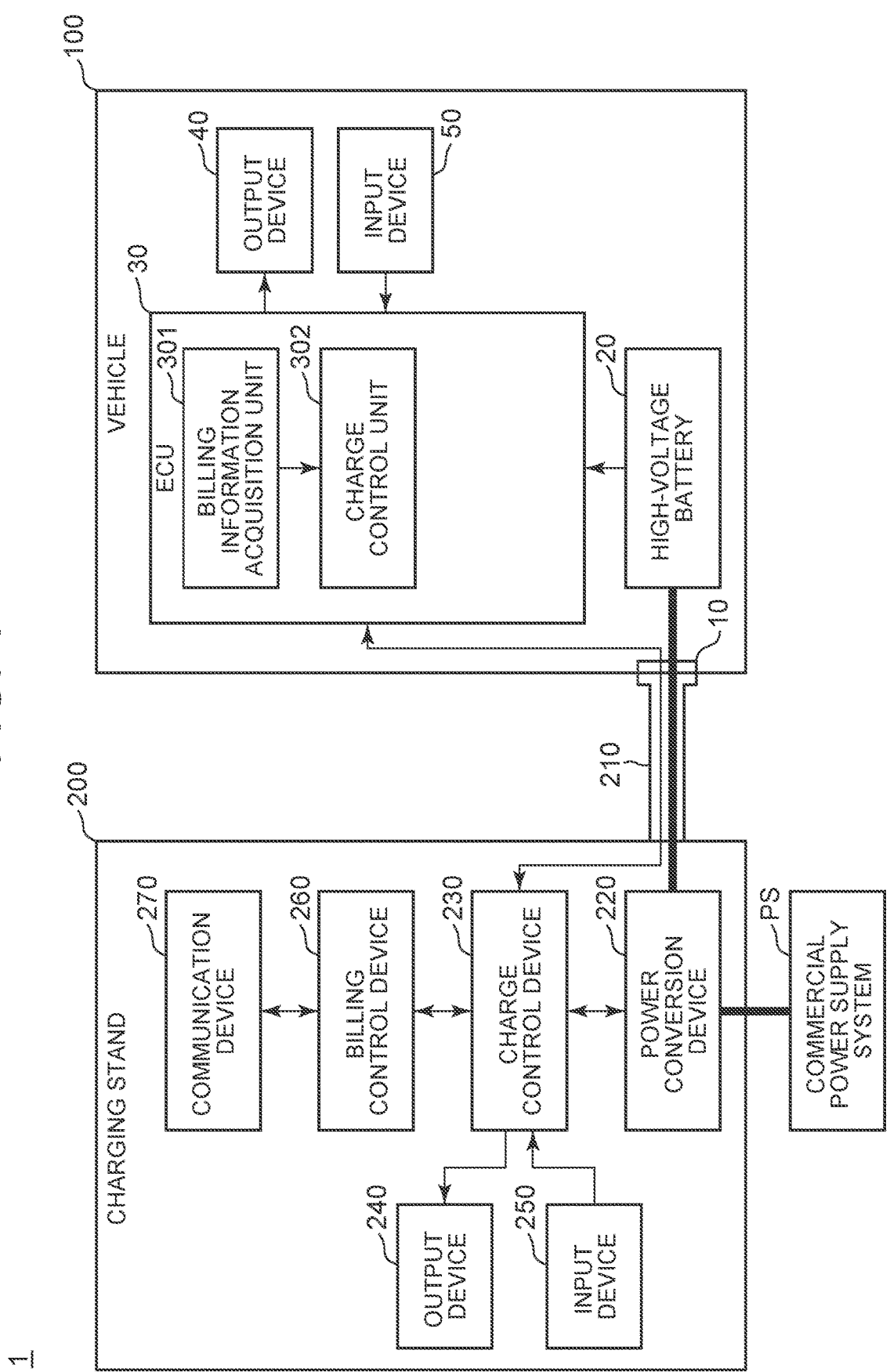
FIG. 1 is a diagram showing an example of a configuration of a vehicle charging system.

FIG. 1 is a diagram showing an example of a configuration of the vehicle charging system 1. Thick solid lines in FIG. 1 represent electric power paths, and thin solid lines represent signal paths. Hereinafter, the same applies to FIG. 3.

As shown in FIG. 1, the vehicle charging system 1 includes a vehicle 100 and a charging stand 200.

The vehicle 100 is equipped with a high-voltage battery 20 and is charged with electric power supplied from the charging stand 200. The vehicle 100, for example, drives a drive motor for driving drive wheels using the electric power from the high-voltage battery 20 and runs.

The charging stand 200 is connected to a charging port 10 of the vehicle 100 through a charging cable 210. The charging stand 200 converts alternate current (AC) power supplied from a commercial power supply system PS into direct current (DC) power, and outputs the converted DC power to the vehicle 100 so as to charge the high-voltage battery 20 of the vehicle 100.

The charging stand 200 is installed, for example, in a public charging station. The charging station may be installed as a dedicated facility for charging the vehicle 100, or may be installed in a public facility such as a rest area of a highway.

For example, the user of the vehicle 100 can operate the charging stand 200 through an input device 250 of the charging stand 200 to start charging the high-voltage battery 20 of the vehicle 100. The users of the vehicle 100 include, for example, an owner of the vehicle 100, a driver of the vehicle 100, and passengers of the vehicle 100.

Example of Vehicle Charging System

Next, an example of the vehicle charging system 1 according to the embodiment will be described with reference to FIG. 2 in addition to FIG. 1.

Vehicle Charging System Configuration

First, the configuration of the vehicle charging system 1 according to an example will be described.

Vehicle Configuration

As shown in FIG. 1, the vehicle 100 according to the example includes a charging port 10, the high-voltage battery 20, an electronic control unit (ECU) 30, an output device 40, and an input device 50.

The charging port 10 is provided on a surface of a vehicle body (body) on the outer side of the vehicle 100, and is configured to be connectable with a connection terminal at the tip of the charging cable 210 of the charging stand 200. As a result, when the user of the vehicle 100 inserts the connection terminal of the charging cable 210 into the charging port 10 to connect therebetween, the charging stand 200 communicates with the vehicle 100 through the electric power path, and a state where the electric power can be supplied from the charging stand 200 to the vehicle 100 is established. Similarly, the charging stand 200 communicates with the vehicle 100 through the signal path, and a state where the vehicle 100 (the ECU 30) is communicable with the charging stand 200 (a charge control device 230 that will be described later) is established.

The communication between the vehicle 100 (the ECU 30) and the charging stand 200 (the charge control device 230) may be performed via a wireless communication line. The wireless communication line may be, for example, a short-range wireless communication line such as Wi-Fi or Bluetooth (registered trademark).

The high-voltage battery 20 has, for example, a very high output voltage (for example, several hundred volts) and supplies the electric power to a drive motor mounted on the vehicle 100. The high-voltage battery 20 is connected to the charging port 10 through the electric power path and is charged with the electric power (DC electric power) supplied from the charging stand 200.

Further, the high-voltage battery 20 incorporates, for example, various sensors (hereinafter, "built-in sensor"), and detection signals of the built-in sensor are captured into the ECU 30. The built-in sensor includes, for example, a current sensor that detects current of the high-voltage battery 20, a voltage sensor that detects the voltage, and a temperature sensor that detects the temperature. Further, the built-in sensor may include a battery sensor capable of incorporating the functions of the sensors above in an integrated manner and further outputting a charge rate of the high-voltage battery 20, etc., based on the detection signal. With the configuration above, the ECU 30 can identify a state of the high-voltage battery 20.

The ECU 30 controls the vehicle 100. Specifically, the ECU 30 controls charging of the high-voltage battery 20.

The function of the ECU 30 may be realized by any hardware, or a combination of any hardware and software. The ECU 30 is mainly composed of a computer including, for example, a memory device such as a central processing unit (CPU) and a random access memory (RAM), an auxiliary storage device such as a read only memory (ROM), and an interface device for external input and output. Hereinafter, the same may apply to the charge control device 230 and a billing control device 260, which will be described later. The ECU 30 includes, for example, a billing information acquisition unit 301 and a charge control unit 302 as functional units realized by loading a program installed in the auxiliary storage device into the memory device and executing the program on the CPU.

The output device 40 is provided in a cabin of the vehicle 100 and outputs various information to the user of the vehicle 100. With the configuration above, for example, the user of the vehicle 100 can confirm information, such as setting contents on the vehicle 100 side, regarding the charging of the high-voltage battery 20 with the electric power supply from the charging stand 200 through the output device 40. The output device 40 includes, for example, a display device that displays various information images under the control of the ECU 30. The display device includes, for example, a liquid crystal display and an organic electroluminescence (EL) display. Further, the output device 40 includes, for example, a sound output device that outputs various types of auditory information, such as voice information, under the control of the ECU 30. The sound output device includes, for example, a speaker and a buzzer. Further, the output device 40 may include, for example, a communication device that outputs (transmits) data including various information to a user terminal (for example, a smartphone and a tablet terminal) possessed by the user of the vehicle 100. The communication device may, for example, communicate with a mobile terminal such as a smartphone or tablet terminal brought into the cabin of the vehicle 100 by the user through a short-range wireless communication line such as Bluetooth or Wi-Fi.

The input device 50 is provided in the cabin of the vehicle 100 and receives an input from the user of the vehicle 100. With the configuration above, the user of the vehicle 100 can use, for example, the input device 50 to input settings related to charging the high-voltage battery 20 with the electric power supply from the charging stand 200. The input device 50 includes, for example, an operation input device that receives an operation input from a user of the vehicle 100. The operation input device includes, for example, a touch panel mounted on the output device 40 (display device), a touch pad provided separately from the output device 40, a button switch, a toggle switch, and a lever switch. The input device 50 includes, for example, a voice input device that receives a voice input from the user of the vehicle 100. The voice input device includes, for example, a microphone. Further, the input device 50 includes, for example, a gesture input device that accepts gesture input from the user of the vehicle 100. The gesture input device includes, for example, a camera (imaging device) capable of capturing the state of the user's gesture. Further, the input device 50 may include, for example, a communication device that inputs (receives) a signal corresponding to the input from the user, which is input from the user terminal possessed by the user of the vehicle 100.

The billing information acquisition unit 301 acquires information regarding billing for charging the high-voltage battery 20 with the electric power supplied from the charging stand 200 (hereinafter, "billing information"). The billing information is transmitted from the charging stand 200. The billing information includes, for example, information relating to the electric power fee for the time slots that are divided in advance and in which charging is performed (for example, a fee per predetermined unit electric energy). This is because the electric power fee may vary depending on the time slot in which charging is performed.

The billing information may be obtained from devices other than the charging stand 200. For example, the ECU 30 may communicate with a server that performs processing related to management of the charging stand 200 through a communication device (for example, data communication module (DCM)) mounted on the vehicle 100, and may acquire (receives) the billing information from this server.

The charge control unit 302 controls charging of the high-voltage battery 20 with the electric power supplied from the charging stand 200 (hereinafter referred to as "charge control").

The charge control unit 302 executes processing (hereinafter referred to as "charge start sequence") relating to, for example, communication prior to a start of charging, including exchange of predetermined data between the charge control unit 302 and the charging stand 200 in response to a predetermined request input from the charging stand 200 (the charge control device 230). The charge start sequence includes processing of communication relating to a negotiation with the charging stand 200 (the charge control device 230) so as to determine the electric power fee to be billed.

Further, the charge control unit 302 transmits, for example, data (detection data) corresponding to the detection signal captured from the built-in sensor captured of the high-voltage battery 20 to the charging stand 200 (the charge control device 230). With the processing above, the charging stand 200 (the charge control device 230) can identify the state of the high-voltage battery 20.

Further, the charge control unit 302 may issue a request to the charging stand 200 (the charge control device 230) to suspend charging when, for example, the time slot divided relating to the electric power fee to be billed is switched to the time slot in which the electric power fee is relatively low after the switching compared to before the switching. The charge control unit 302 may restart charging of the high-voltage battery 20 after the charge control unit 302 executes the charge start sequence with the charging stand 200 again and determines a state in which the electric power fee for the time slot after switching is applied. Details of the control processing executed by the charge control unit 302 including temporary suspension of charging and restart of charging will be described later (see FIGS. 2 and 4).

Charging Stand

As shown in FIG. 1, the charging stand 200 includes the charging cable 210, a power conversion device 220, the charge control device 230, an output device 240, the input device 250, the billing control device 260, and a communication device 270.

The charging cable 210 is provided so as to extend from the housing of the charging stand 200. As described above, the charging cable 210 has a connection terminal at the tip of the charging cable 210. The connection terminal is connectable to the charging port 10.

The power conversion device 220 converts the AC power supplied from the commercial power supply system PS into the DC power for charging the high-voltage battery 20 and outputs the converted DC power. The power conversion device 220 includes, for example, a power conversion circuit that converts the AC power into the DC power for charging the high-voltage battery 20, a drive circuit that drives a switching element of the power conversion circuit, etc., and a control circuit that controls the drive circuit. Further, the functions of the drive circuit and the control circuit may be provided outside the power conversion device 220 (for example, the charge control device 230).

The charge control device 230 controls charging of the high-voltage battery 20 while exchanging communication with the ECU 30 of the vehicle 100.

For example, the charge control device 230 communicates with the ECU 30 of the vehicle 100 in response to the input regarding the start of charging received from the user through the input device 250, and executes the charge start sequence. Subsequently, when the charge start sequence is completed, the charge control device 230 controls the power conversion device 220 to start charging of the high-voltage battery 20.

Further, for example, when the charge control device 230 receives, from the vehicle 100 (the ECU 30), a request signal for suspending charging and executing the charge start sequence again during charging of the high-voltage battery 20, the charge control device 230 stops charging and executes the charge start sequence with the ECU 30. Subsequently, when the charge start sequence is completed, the charge control device 230 controls the power conversion device 220 to restart charging of the high-voltage battery 20.

Further, when the charge control device 230 satisfies, for example, a predetermined condition indicating completion of charging of the high-voltage battery 20 (hereinafter referred to as "charge completion condition"), the charge control device 230 stops the power output from the power conversion device 220 to complete charging of the high-voltage battery 20. The charge completion condition may be, for example, that the high-voltage battery 20 has reached a predetermined charge amount (for example, a charge amount corresponding to a full charge). Further, the charge completion condition may be, for example, a condition relating to time elapsed from the start of charging. Further, the charge completion condition may be, for example, a condition relating to an integrated value of electric power supply amounts from the start of charging. The charge completion condition may be determined, for example, in response to a predetermined input from the user through the input device 250. With the processing above, the user of the charging stand 200 can set the desired charge completion condition through the input device 250 before the start of charging.

The output device 240 outputs various types of information to the user of the charging stand 200. When the high-voltage battery 20 of the vehicle 100 is charged, the user of the charging stand 200 is the user of the vehicle 100. With the configuration above, for example, the user of the charging stand 200 can confirm, using the output device 240, information relating to charging of the high-voltage battery 20 with the electric power supply from the charging stand 200. The output device 240 includes, for example, a display device that displays various information images under the control of the charge control device 230. Further, the output device 240 includes, for example, a sound output device that outputs various types of auditory information, such as voice information, under the control of the charge control device 230.

The input device 250 receives the input from the user of the charging stand 200. With the processing above, the user of the charging stand 200 can perform, using the input device 250, operations relating to charging of the high-voltage battery 20 with the electric power supply from the charging stand 200. The input device 250 includes, for example, an operation input device that receives an operation input from the user of the charging stand 200. The input device 250 includes, for example, a voice input device that receives a voice input from the user of the charging stand 200. Further, the input device 250 includes, for example, a gesture input device that accepts gesture input from the user of the charging stand 200.

The billing control device 260 executes control relating to the billing to the user for charging of the vehicle 100 (the high-voltage battery 20) with the electric power supply from the charging stand 200.

The billing control device 260 outputs (transmits) the billing information to the charge control device 230, for example, in response to a request from the charge control device 230. With the configuration above, the charge control device 230 can transmit the billing information to the vehicle 100 (the ECU 30) in the charge start sequence.

Further, the billing control device 260 determines the fee to be billed to the user based on, for example, the electric power fee determined in the charge start sequence and the electric energy supplied from the charging stand 200 to the high-voltage battery 20 after charging of the high-voltage battery 20 is completed. During the processing above, as described above, when charging is restarted after charging is suspended during charging of the high-voltage battery 20 and the electric power fee to be billed is changed, the electric power fee before the change is applied to the electric power supplied before the suspension, and the electric power fee after the change is applied to the electric power supplied after the suspension.

Further, for example, the billing control device 260 transmits information relating to the determined fee billed to the user of the charging stand 200 to a payment settlement server through the communication device 270. The payment settlement server executes processing relating to settlement of the fee billed to the user. With the processing above, the payment settlement server can settle payment corresponding to the billing to the user in accordance with a payment settlement method of the user that is registered in advance, for example.

The communication device 270 connects to a predetermined communication network and communicates with an external device (for example, the payment settlement server) of the charging stand 200. The predetermined communication network includes, for example, a mobile network with a base station as a terminal and the Internet network.

Charge Control Processing

Next, control processing relating to charging of the high-voltage battery 20 (hereinafter referred to as "charge control processing") to be executed by the ECU 30 will be described.

Figure 2:
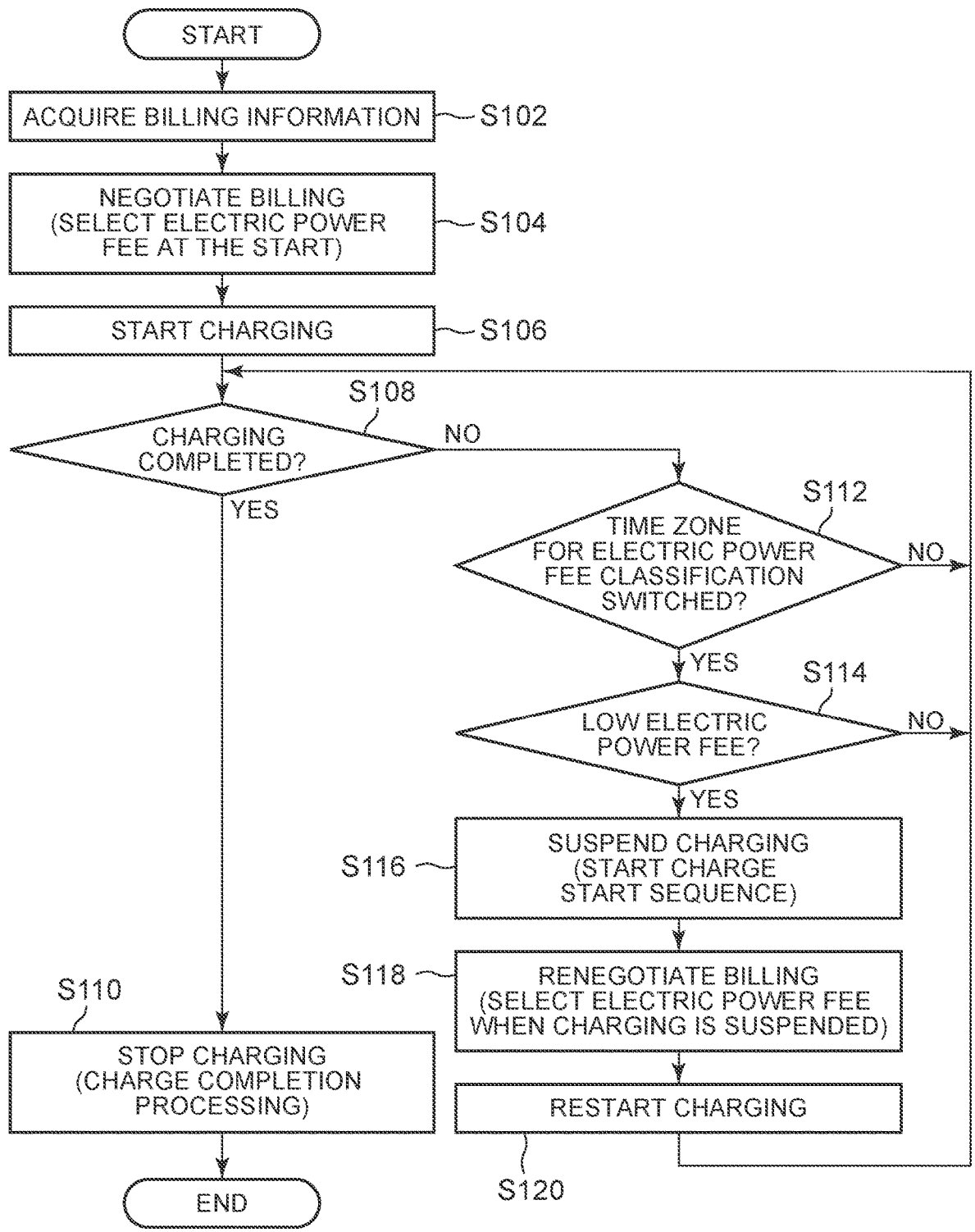
FIG. 2 is a flowchart schematically showing an example of control processing relating to charging of a high-voltage battery to be executed by an electronic control unit (ECU)

FIG. 2 is a flowchart schematically showing an example of charge control processing executed by the ECU 30. The ECU 30 starts execution of the flowchart when the charge start sequence between the ECU 30 and the charge control device 230 is started. The same may apply to a flowchart shown in FIG. 4 that will be described later.

As shown in FIG. 2, in step S102, the billing information acquisition unit 301 acquires the billing information received from the charge control device 230 in the process of the charge start sequence.

The ECU 30 proceeds the step to step S104 when the processing in step S102 is completed.

In step S104, the charge control unit 302 negotiates billing in the process of the charge start sequence. Specifically, the charge control unit 302 selects the electric power fee in the time slot corresponding to the start of charging (that is, at present) based on the billing information, and transmits a signal requesting charging at the selected electric power fee to the charging stand 200 (the charge control device 230). With the processing above, the charge control device 230 can confirm whether the selected electric power fee for charging corresponds to the electric power fee in the time slot at the start of charging, and determine the electric power fee to be billed to the user.

When the processing in step S104 is completed, the ECU 30 proceeds to step S106.

In step S106, the charge control unit 302 starts charging of the high-voltage battery 20 in response to completion of the charge start sequence. Specifically, the charge control unit 302 sequentially transmits data corresponding to the detection signal captured from the built-in sensor of the high-voltage battery 20 to the charging stand 200 (the charge control device 230). With the processing above, the charge control device 230 operates the power conversion device 220 based on the data sequentially received from the vehicle 100 (the ECU 30) in accordance with the state of the high-voltage battery 20 while identifying the state of the high-voltage battery 20 and executes charging of the high-voltage battery 20.

The ECU 30 proceeds the step to step S108 when the processing in step S106 is completed.

In step S108, the charge control unit 302 determines whether the charging of the high-voltage battery 20 is completed. Whether charging is completed may be determined based on, for example, whether the charge completion condition is satisfied as described above. Whether the charge completion condition is satisfied may be determined by the ECU 30 or may be determined by the charge control device 230. When the charge control device 230 determines whether the charge completion condition is satisfied, the charge control unit 302 may execute the determination in step S108 based on whether a signal indicating completion of charging of the high-voltage battery 20 from the charging stand 200 (the charge control device 230) is received, for example. The charge control unit 302 proceeds to step S110 when charging of the high-voltage battery 20 is completed, and proceeds to step S112 when charging of the high-voltage battery 20 is not completed.

In step S110, the charge control unit 302 executes processing relating to completion of charging of the high-voltage battery 20 involving communication with the charge control device 230 in accordance with stop of charging of the high-voltage battery 20.

When the processing in step S110 is completed, the ECU 30 ends the processing in the current flowchart.

In step S112, the charge control unit 302 determines whether the time slot of the electric power fee to be billed is switched based on the billing information and information on the current time. The charge control unit 302 can acquire the information on the current time using, for example, a clock function built in the ECU 30, such as a real time clock (RTC). The charge control unit 302 proceeds to step S114 when the time slot of the electric power fee to be billed is switched, and returns to step S108 when the time slot is not switched.

In step S114, the charge control unit 302 determines whether the electric power fee to be billed is reduced as the time slot is switched. The charge control unit 302 proceeds to step S116 when the electric power fee to be billed is reduced. The charge control unit 302 returns to step S108 when the electric power fee is not reduced.

In step S116, the charge control unit 302 transmits a signal requesting suspension of charging of the high-voltage battery 20 to the charging stand 200 (the charge control device 230). The charge control unit 302 starts the charge start sequence that involves communication with the charge control device 230 in response to a reply from the charge control device 230.

The ECU 30 proceeds the step to step S118 when the processing in step S116 is completed.

In step S118, the charge control unit 302 negotiates (renegotiates) the billing in the process of the charge start sequence after the suspension of charging. Specifically, the charge control unit 302 selects the electric power fee in the time slot corresponding to the time slot after the switching based on the billing information, and transmits a signal requesting charging at the selected electric power fee to the charging stand 200 (the charge control device 230). With the processing above, the charge control device 230 can confirm whether the selected electric power fee for charging corresponds to the electric power fee in the current time slot, and determine the electric power fee to be billed to the user.

The ECU 30 proceeds the step to step S120 when the processing in step S118 is completed.

In step S120, the charge control unit 302 starts (restarts) charging of the high-voltage battery 20 in response to completion of the charge start sequence.

The ECU 30 returns to step S108 when the processing in step S120 is completed.

Actions

Next, actions of the vehicle charging system 1 according to the example will be described.

In the example, the ECU 30 (an example of a control device) executes control relating to charging of the high-voltage battery 20 (an example of a power storage device) mounted on the vehicle 100 from the charging stand 200 (an example of an external power supply). Specifically, the billing information acquisition unit 301 acquires the billing information (an example of information relating the electric power fee for charging in each time slot that is divided in advance). When the time slot is switched such that the electric power fee becomes relatively low after switching of the time slot compared to before the switching during charging, the charge control unit 302 (an example of the control unit) causes the charging stand 200 to charge the high-voltage battery 20 such that a relatively low electric power fee is applied in the time slot after the switching.

With the processing above, the vehicle charging system 1 (the ECU 30) can execute charging of the high-voltage battery 20 mounted in the vehicle 100 at a lower fee in the public charging facilities where the charging stand 200 is installed.

Further, in the example, when the time slot is switched during charging of the high-voltage battery 20 by the charging stand 200 such that the electric power fee becomes relatively low after the switching of the time slot compared to before the switching, the charge control unit 302 suspends charging and executes the charge start sequence (an example of the processing relating to the start of charging), including the processing relating to the billing of the electric power fee, again in the time slot after the switching.

With the processing above, the ECU 30 can restart charging at a relatively low electric power fee by renegotiating the billing with the charging stand 200 (the charge control device 230) in accordance with the switching to the time slot in which the electric power fee is relatively low. Therefore, specifically, the ECU 30 can cause the charging stand 200 to charge the high-voltage battery 20 such that a relatively low electric power fee is applied in the time slot after the switching.

The ECU 30 may cause the charging stand 200 to charge the high-voltage battery 20 such that a relatively low electric power fee is applied using a method other than the method of suspending charging and executing the charge start sequence again. For example, the ECU 30 acquires the charge amount (remaining amount) of the high-voltage battery 20 at that time at the stage of the charge start sequence, and predicts the time required from the start of charging to the completion of charging (for example, full charging). The ECU 30 may calculate the charge amount (remaining amount) of the high-voltage battery 20 based on the detection signal captured from the built-in sensor of the high-voltage battery 20. Further, the ECU 30 may predict whether switching of the time slot in which the electric power fee becomes relatively low after switching of the time slot compared to before the switching will occur during the charging based on a predicted value of the time required for charging and the billing information. The ECU 30 may negotiate application of the electric power fee with the charge control device 230 at the stage of the initial charge start sequence such that the electric power fee to be applied is switched before and after the switching of the time slot when the ECU 30 predicts that the switching of the time slot in which the electric power fee becomes relatively low after switching of the time slot will occur. In this case, the charge control device 230 may apply different electric power fees between the charge amounts before and after the switching of the time slot in accordance with a method of applying the electric power fee that is determined through negotiation. Therefore, the charge control device 230 does not need to suspend charging when the charge amount before and after the switching of the time slot can be separately measured (calculated).

Further, in the example, the charge control unit 302 continues charging when the time slot is switched such that the electric power fee becomes relatively high after the switching of the time slot compared to before the switching during charging of the high-voltage battery 20 by the charging stand 200.

With the processing above, when the time slot is switched to the time slot in which the electric power fee becomes relatively high, the ECU 30 can apply the electric power fee in the time slot before the switching to the billing. Accordingly, the vehicle charging system 1 (the ECU 30) can cause the charging stand 200 to charge the high-voltage battery 20 mounted on the vehicle 100 at a lower fee in the public charging facilities where the charging stand 200 is installed.

Another Example of Vehicle Charging System

Next, another example of the vehicle charging system 1 according to the embodiment will be described with reference to FIGS. 3 and 4.

Vehicle Charging System Configuration

First, the configuration of the vehicle charging system 1 according to an example will be described.

Figure 3:
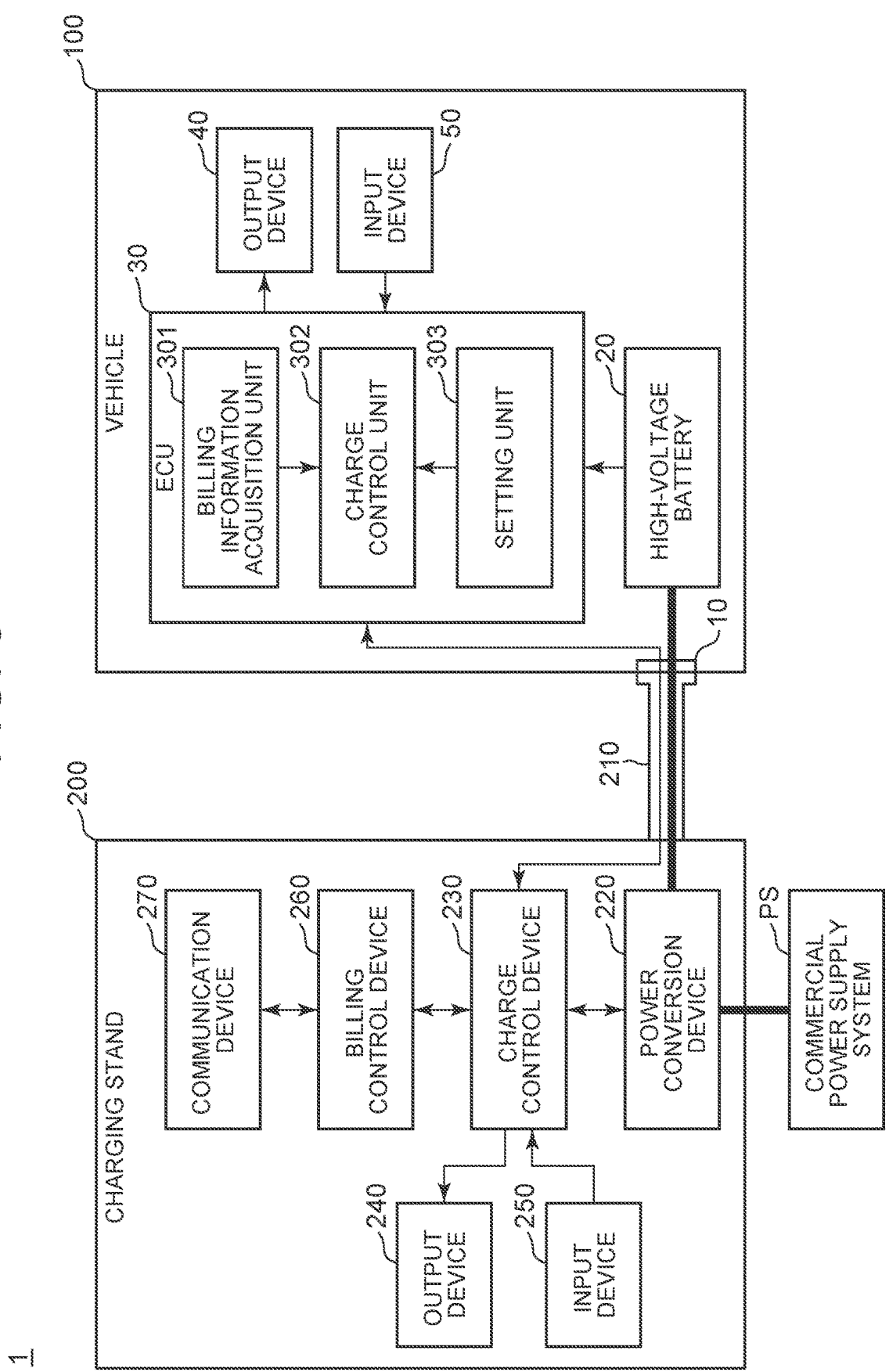
FIG. 3 is a diagram showing another example of the configuration of the vehicle charging system.

FIG. 3 is a diagram showing another example of the configuration of the vehicle charging system 1. In the vehicle charging system 1 according to the example, of the vehicle 100 and the charging stand 200, only the configuration of the vehicle 100 is different from the case of the above example (FIG. 1). Hereinafter, the description will be focused on portions different from the example above, and the descriptions may be omitted for the same contents as the example above.

Vehicle Configuration

As shown in FIG. 3, the vehicle 100 according to the example includes the charging port 10, the high-voltage battery 20, the ECU 30, the output device 40, and the input device 50, as in the case of the above example.

The ECU 30 includes, for example, the billing information acquisition unit 301, the charge control unit 302, and a setting unit 303 as functional units realized by loading a program installed in the auxiliary storage device into the memory device and executing the program on the CPU.

The setting unit 303 executes a setting relating to charging of the high-voltage battery 20 by the charging stand 200 in response to a predetermined input received from the user through the input device 50.

For example, the setting unit 303 executes a setting on whether to enable or disable a function (hereinafter referred to as "renegotiation function" for convenience) to suspend charging in accordance with switching of the time slot to the time slot where the electric power fee is relatively low and to execute the charge start sequence with the charge control device 230 again, for example. This allows the user of the vehicle 100 to manually switch between enabling and disabling of the renegotiation function using the input device 50.

Charge Control Processing

Next, the charge control processing executed by the ECU 30 will be described.

Figure 4:
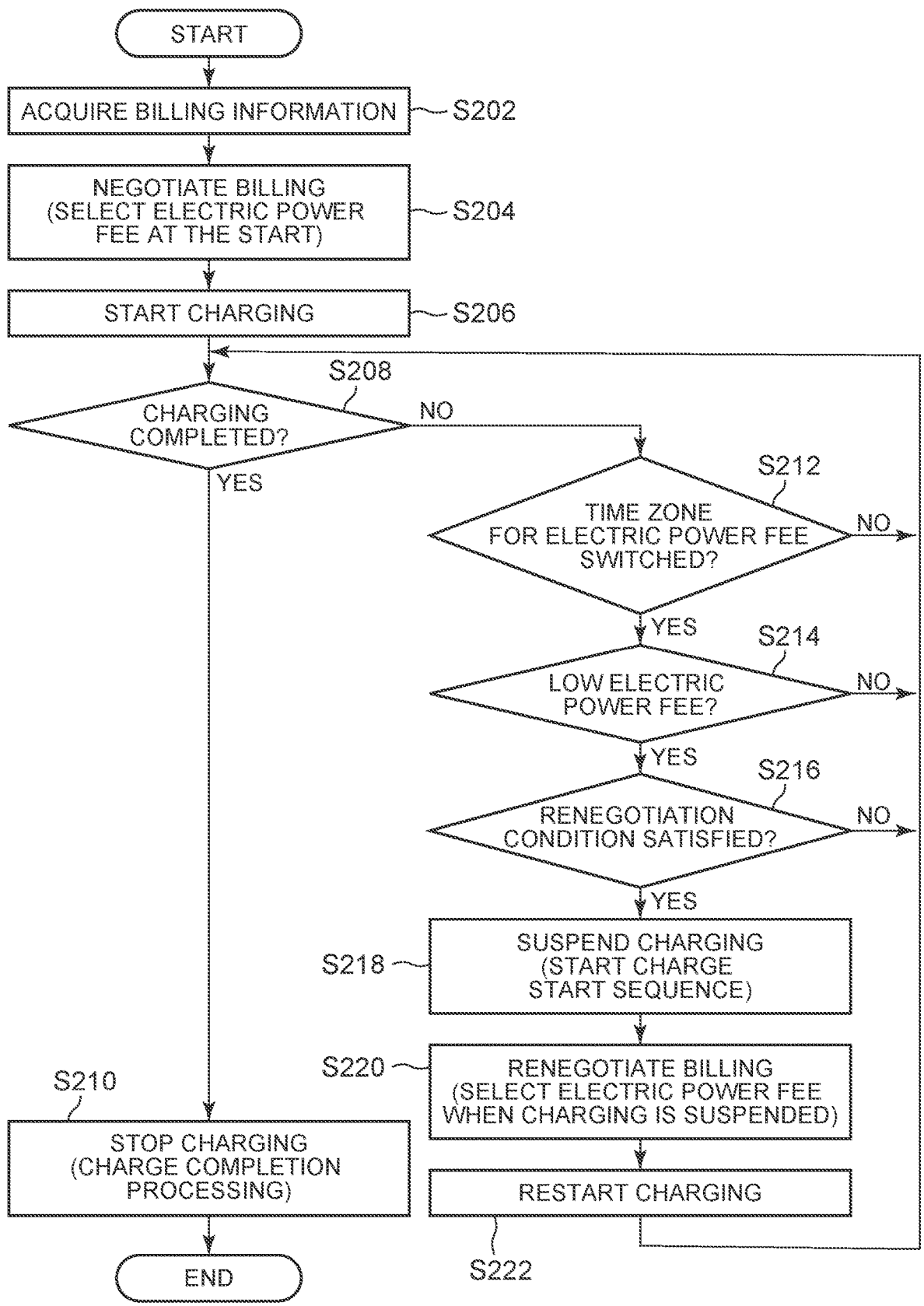
FIG. 4 is a flowchart schematically showing another example of the control processing relating to charging of the high-voltage battery to be executed by the ECU.

FIG. 4 is a flowchart schematically showing another example of the control processing, executed by the ECU 30, relating to charging of the high-voltage battery 20.

As shown in FIG. 4, steps S202 to S214 are the same as the processing in steps S102 to S114 in FIG. 2, and thus the descriptions thereof will be omitted.

The charge control unit 302 proceeds to step S216 when the electric power fee to be billed is reduced in step S214. The charge control unit 302 returns to step S208 when the electric power fee is not reduced.

In step S216, the charge control unit 302 determines whether the renegotiation condition is satisfied.

For example, the renegotiation condition may include that "the renegotiation function is enabled by the setting unit 303" (hereinafter referred to as a "first condition"). Further, for example, the renegotiation condition may include that "the charge amount (remaining amount) of the high-voltage battery 20 at that time reaches or falls below a predetermined threshold value" (hereinafter referred to as a "second condition"). The threshold value for the second condition may be predetermined, for example, to a relatively large value (for example, 80% with respect to full charge). Further, the threshold value for the second condition may be manually settable (changeable) by the user. In this case, the setting unit 303 may set the threshold value for the second condition in accordance with a predetermined input received from the user through the input device 50. Further, the renegotiation condition includes, for example, that "an extent of reduction of the electric power fee before and after switching of the time slot relating to the electric power fee for charging reaches or exceeds a predetermined threshold value" (hereinafter referred to as a "third condition"). For example, the threshold value for the third condition may be fixed, or may be manually settable (changeable) by the user as in the case of the threshold value for the second condition. In the latter case, the setting unit 303 may set the threshold value for the third condition in accordance with a predetermined input received from the user through the input device 50.

When the renegotiation condition is satisfied (specifically, a plurality of conditions included in the renegotiation condition is entirely satisfied), the charge control unit 302 proceeds to step S218. When the renegotiation condition is not satisfied, the processing returns to step S208.

When there is a plurality of candidates for the renegotiation condition (hereinafter referred to as "candidate conditions") as in the first to third conditions described above, the setting unit 303 may set whether to enable or disable each of the candidate conditions in response to a predetermined input received from the user through the input device 50. With the configuration above, the user can select, using the input device 50, one of the candidate conditions to be actually applied as the renegotiation condition. Further, the setting unit 303 may set whether to enable or disable the renegotiation condition itself, that is, whether to enable or disable the determination processing in step S216 in response to a predetermined input received from the user through the input device 50. When the renegotiation condition is disabled, the processing along the same flowchart as in the above example (FIG. 2) is executed.

Steps S218 to S222 are the same as steps S116 to S120 in FIG. 2. Therefore, descriptions thereof will be omitted.

Actions

Next, actions of the vehicle charging system 1 (the ECU 30) according to the example will be described.

In the example, when the time slot is switched such that the electric power fee becomes relatively low after the switching of the time slot compared to before the switching during charging of the high-voltage battery 20 by the charging stand 200, the setting unit 303 suspends the charging in accordance with a predetermined input received from the user and sets whether to enable or disable the function (the renegotiation function) of executing the charge start sequence including the processing relating to the billing of the electric power fee, again in the time slot after the switching.

With the processing above, when the renegotiation function is disabled, the ECU 30 can continue charging and shorten the time required for charging even when the time slot is switched to the time slot in which the electric power fee is relatively low. Therefore, for example, when the user intends to shorten the time required for charging of the high-voltage battery 20 rather than to reduce the electric power fee, the renegotiation function can be disabled using the input device 50. Therefore, the ECU 30 can reflect the intention of the user, that is, whether the user places an importance on the electric power fee or the time required for charging in the charge control processing.

Further, in the example, the charge control unit 302 continues charging when the charge amount of the high-voltage battery 20 is relatively large although the time slot is switched such that the electric power fee becomes relatively low after the switching of the time slot compared to before the switching during charging of the high-voltage battery 20 by the charging stand 200.

With the processing above, the ECU 30 can prioritize shortening of the time required for charging when an effect of reducing the electric power fee to be billed is relatively low although the electric power fee becomes relatively low by switching the time slot. This is because when the charge amount of the high-voltage battery 20 is relatively large, the remaining electric energy supplied to the high-voltage battery 20 is relatively small, and the effect of reducing the electric power fee to be billed becomes relatively low.

Further, in the example, the charge control unit 302 continues charging when a difference in the electric power fee after switching is relatively small although the time slot is switched such that the electric power fee becomes relatively low after the switching of the time slot compared to before the switching during charging of the high-voltage battery 20 by the charging stand 200.

With the processing above, the ECU 30 can prioritize shortening of the time required for charging when the effect of reducing the electric power fee to be billed is relatively low although the electric power fee becomes relatively low by switching the time slot.

Modification and Change

Although the embodiment has been described in detail above, the present disclosure is not limited to such specific embodiment, and various modifications and improvements can be made within the scope of the gist described in the claims.

For example, in the above embodiment, the ECU 30 functions to cause the charging stand 200 to charge the high-voltage battery 20 such that the electric power fee that is relatively low is billed. In place of the ECU 30, the charge control device 230 (an example of the control device) may execute a similar function. Specifically, the charge control processing shown in FIGS. 2 and 4 may be executed by the charge control device 230. Further, similar to the case of the ECU 30, the charge control device 230 may cause the charging stand 200 to charge the high-voltage battery 20 such that the electric power fee that is relatively low is billed using a method other than the method of suspending charging and executing the charge start sequence again. For example, the charge control device 230 acquires the charge amount (remaining amount) of the high-voltage battery 20 at that time at the stage of the charge start sequence, and predicts the time required from the start of charging to the completion of charging (for example, full charging). The charge control device 230 may calculate the charge amount (remaining amount) of the high-voltage battery 20 based on the detection signal captured from the built-in sensor of the high-voltage battery 20, or may acquire (receive) information relating to the charge amount (remaining amount) that is calculated using the same method and transmitted from the ECU 30. Further, the charge control device 230 may predict whether switching of the time slot in which the electric power fee becomes relatively low after switching of the time slot compared to before the switching will occur during the charging based on the predicted value of the time required for charging and the billing information. The charge control device 230 may determine a method of applying the electric power fee such that the electric power fee to be applied before and after switching of the time slot is switched at the stage of the initial charge start sequence when the charge control device 230 predicts that the switching of the time slot in which the electric power fee becomes relatively low after switching of the time slot compared to before the switching will occur. In this case, the charge control device 230 may apply different electric power fee to the charge amounts before and after the switching of the time slot in accordance with the method of applying the electric power fee that is determined in the charge start sequence. Accordingly, the charge control device 230 does not need to suspend charging only when the charge amounts before and after the switching of the time slot can be separately measured (calculated), as described above.

What is claimed is:

1. An electronic control unit that executes control relating to charging of a power storage device mounted on a vehicle from an external power supply, the electronic control unit comprising:
a processor programmed to:
acquire information relating to an electric power fee for the charging in each of a plurality of time slots;
execute control to start charging the power storage device mounted on the vehicle;
after the start of charging, determine that a time slot of the plurality of time slots changes to a subsequent time slot in which the electric power fee is different, based on a current time that is acquired by the processor;

when the time slot changes to the subsequent time slot, and if the electric power fee becomes lower after changing of the time slot as compared to before the changing during the charging, cause the external power supply to charge the power storage device so as to apply the electric power fee that is lower in the subsequent time slot; and when the time slot changes to the subsequent time slot, and if the electric power fee becomes higher after the changing of the time slot as compared to before the changing during the charging, continue the charging at an electric power fee before the changing.

2. The electronic control unit according to claim 1, wherein the processor is programmed to:

suspend the charging when the time slot changes and if the electric power fee becomes lower after the changing of the time slot as compared to before the changing during the charging; and execute control relating to a restart of the charging, including processing relating to billing of the electric power fee, again in the subsequent time slot.

3. The electronic control unit according to claim 2, wherein the processor is programmed to:

suspend the charging in accordance with a predetermined input received from an user when the time slot changes and if the electric power fee becomes lower after the changing of the time slot compared to before the changing during the charging; and enable or disable a function of executing the control relating to the restart of the charging, including the processing relating to the billing of the electric power fee, again in the subsequent time slot.

4. The electronic control unit according to claim 2, wherein the processor is programmed to continue the charging when a charge amount of the power storage device is above a predetermined threshold and the time slot is changed and the electric power fee becomes lower after the changing of the time slot compared to before the changing during the charging.

5. The electronic control unit according to claim 1, wherein the electronic control unit is mounted on the vehicle.

* * * * *